Sept. 27, 1960 F. NEGRI 2,954,161
TAPE READER
Filed Nov. 20, 1957
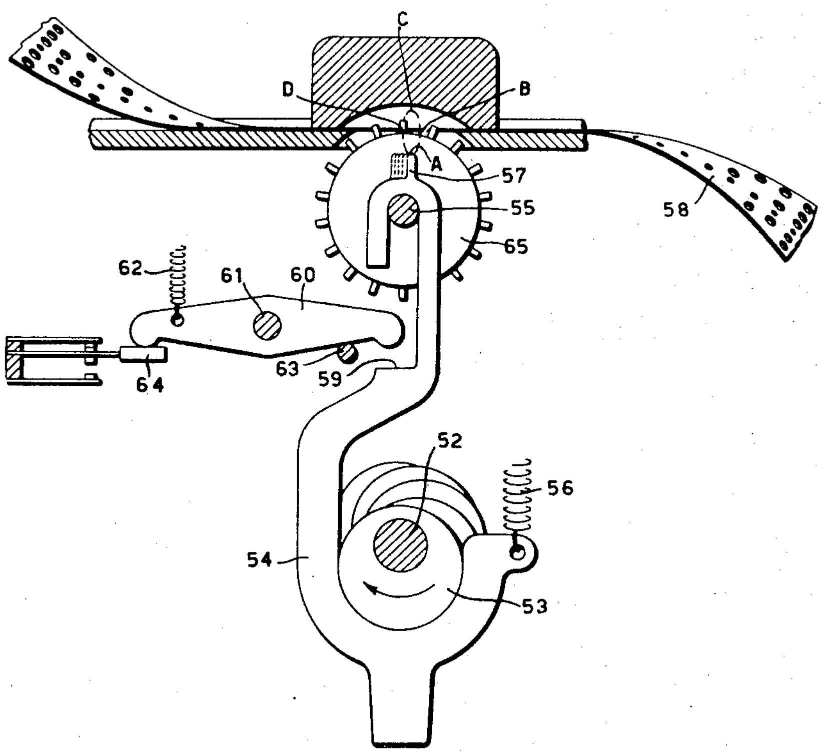
INVENTOR
FRANCO NEGRI
BY
Kenyon & Kenyon
ATTORNEYS United States Patent Office 2,954,161

Patented Sept. 27, 1960

2,954,161

TAPE READER

Franco Negri, Ivrea, Italy, assignor to Ing. C. Olivetti & C., S.p.A., Ivrea, Italy, a corporation of Italy Filed Nov. 20, 1957, Ser. No. 697,580

Claims priority, application Italy Nov. 30, 1956

5 Claims. (Cl. 235—61.11)

The invention relates to a perforated tape reader for printing telegraph systems and for data processing apparatus in general.

Conventional tape readers normally comprise a set of spring actuated sensing pins movable perpendicular to the tape for sensing the code combinations perforated therein, the tape being advanced one step upon completion of the sensing of each code combination. These tape readers are not operable at high speeds because the tape is prevented from being advanced as long as the sensing pins have not been withdrawn therefrom.

It has already been proposed to continuously feed the perforated tape through the tape reader and to allow the sensing pins to move to a limited extent with the tape. To this end each sensing pin is articulated to a cam controlled sensing lever and is adapted, upon passing through a hole perforated in the tape, to travel to a limited extent with the tape being pulled along by the tape against the urge of a spring.

These prior art tape readers possess the inherent disadvantage in that the tape is subjected to a major fatigue and that the sensing pins upon withdrawing from the tape are suddenly restored by their springs thus causing undesirable rebounds.

It is a primary object of the invention to provide a tape reader operable at very high speeds.

It is a further object of the invention to provide a high speed tape reader wherein the sensing pins are integral with the sensing levers instead of being articulated thereto.

Another object of the invention is to provide a tape reader wherein the tape or record medium is relatively free from fatigue.

With these and other objects in view, the present invention contemplates a tap reader comprising tape sensing means movable perpendicular to the tape for sensing the code combinations perforated therein and also movable to a limited extent longitudinally of the tape, a driving mechanism being provided to positively drive said sensing means to cyclically move through said limited extent.

Further objects, features and advantages of the invention will become apparent from the following detailed description of a preferred embodiment thereof, taken in conjunction with the accompanying drawing, which represents a lateral sectional view through a tape reader embodying the invention and operating with a conventional five-unit code.

Referring now to the drawing, the numeral 52 indicates a cyclically rotating cam shaft making one revolution for each code combination to be read. Five circular cam members or eccentrics 53 are secured to the shaft 52 according to a predetermined constant angular displacement, which in the case of the usual seven-and-a-half impulse code will be for instance, of 48°.

Each eccentric 53 is partially embraced by an individual tape sensing means such as a lever 54 slidably mounted on a guiding member such as a shaft 55 and urged upwards by a spring 56, only the lever 54 corresponding to the front cam 53 being shown in the drawing. Each sensing lever 54 is provided with a preferably integral sensing pin 57, the five sensing pins being adapted to sense the code combinations perforated in a tape 58 or other record medium fed continuously through the transmitter. Due to this continuous movement of the tape and since the code combinations perforated in the tape are perpendicular to the direction of movement of the tape, the sensing pins 57 provided on the five sensing levers 54 are disposed across the path of the tape at a slight angle. For the purpose of clarity the four sensing pins 57 arranged behind the front pin are shown, by broken lines, in the position each one assumes when the corresponding lever 54 is in the lowermost position.

Each sensing lever 54 is further provided with an abutment 59 adapted to engage a lever 60 pivoted at 61. Under the urge of a spring 62 each lever 60 normally contacts a stationary pin 63 and upon being rocked counterclockwise operates a contact 64 to either complete or interrupt an electrical circuit to control operation of some form of associated mechanism, not shown in the drawing. For instance, the five contacts 64 may be connected to a conventional rotary distributor rotating in synchronism with the cam shaft 52 to transmit signal impulses corresponding to the code combinations read in the tape 58.

Secured to the shaft 55 is a feed wheel 65 for continuously advancing the tape 58 through the tape reader, the wheel 65 being preferably driven by the cam shaft 52 by means of a conventional reduction gearing, not shown in the drawing and so proportioned as to advance the feed wheel 65 one step for each complete revolution of the shaft 52. The feed wheel 65 engages the usual feed holes provided in the tape between the second and the third combination holes.

The transmitter operates as follows:

Upon rotation of the cam shaft 52 each eccentric 53 cyclically drives the corresponding sensing lever 54 through a path defining a closed geometrical figure which is substantially an ellipse. This elliptical figure, which is shown by broken lines for the top of the sensing pin 57, includes a vertical component perpendicular to the tape 58 and a horizontal component directed longitudinally of said tape.

By inspecting said figure it will be apparent that the top of the sensing pin 57 first moves upwards from A to C, passing through B. At B the sensing pin 57 enters the hole eventually provided in the tape 58 and then advances to D, passing through C, thus moving through a limited extent substantially concurrently with the tape 58 which is advanced horizontally at the same rate. At D the sensing pin is withdrawn from the hole eventually entered. If, however, there is no hole provided in front of the sensing pin 57 the latter, when at B, instead of following the elliptical path BCD, will move straight along the horizontal segment B—D and then return down to A.

The abutment 59 of the sensing lever 54 contacts the lever 60 when the top of the sensing pin 57 reaches the point B. Therefore, if at this instant the sensing pin 57 finds a hole in the tape 58, enabling the sensing lever 54 to further move upwards, the lever 60 will be rocked, thus operating the contact 64. If, on the contrary, the sensing pin 57 is prevented by the tape 58 from further moving upwards, the abutment 59 will ride horizontally without causing the lever 60 to be rocked, whereby the contact 64 will not be operated.

It will be apparent that during one revolution of the cam shaft 52 the five eccentrics 53 will sequentially drive the five sensing levers 54, whereby the five contacts 64 will be sequentially controlled according to the code combination read in the tape 58 to control the associated mechanism mentioned hereinabove.

It will furthermore be apparent that each sensing pin 57, whether or not it enters a hole in the tape 58, is always positively driven according to the horizontal component B—D of its path by the driving mechanism formed of the associated eccentric 53 and sensing lever 54, thereby eliminating the drawbacks of the prior art tape readers and allowing the present tape reader to be operated at very high speeds.

From the foregoing description it will be understood that many changes may be made in the above construction, and different embodiments of the inventions could be made without departing from the scope thereof. It is, therefore, intended that all matter contained in the above description, or shown in the accompanying drawing, shall be interpreted as illustrative, and not in a limiting sense.

What I claim is:

1. In a perforated tape reader having a spring actuated sensing lever including a sensing pin movable perpendicular to and concurrently with said tape according to a closed path, a stationary member for both rotatably and slidably mounting said sensing lever to enable said sensing pin to be so moved, and a rotary cam member engageable with said lever in at least two distinct points for driving said sensing lever.

2. In a perforated tape reader having a spring actuated sensing lever including a sensing pin movable perpendicular to and concurrently with said tape according to a closed path, a slot on one end of said lever, an eccentric embraceable by said slot through about 180 degrees, and a member for guiding the other end of said sensing lever to enable said sensing pin to be so moved, said slot and said mounting member concurrently guiding said other end to be moved to and fro with respect to said eccentric.

3. In a perforated tape reader having a spring actuated sensing lever including a sensing pin movable perpendicular to and concurrently with said tape according to a closed path, a slot on said lever, an eccentric embraceable by said slot through about 180 degrees, and a stationary member for both rotatably and slidably mounting said sensing lever to enable said sensing pin to be so moved, said slot and said stationary member concurrently guiding said lever to be moved to and fro with respect to said eccentric.

4. In a perforated tape reader, a spring actuated sensing lever including a sensing pin movable perpendicular to and concurrently with said tape according to a closed path, a cyclically operable cam member for driving said sensing lever, a stationary member for both rotatably and slidably mounting said sensing lever to enable said sensing pin to be so moved, and a pair of aligned and opposed slots on said lever, one of said slots engaging said cam member, the other slot engaging said guiding member.

5. In a perforated tape reader, a sensing lever including a sensing pin movable perpendicular to and concurrently with said tape, an eccentric embraceable by one end of said sensing lever through about 180 degrees for driving said sensing lever to move said sensing pin according to a substantially elliptical path, a member for both rotatably and substantially rectilinearly guiding said sensing lever at the other end near said pin, and spring means acting upon said lever as to urge said pin toward said tape, said lever being positively driven by said eccentric in a direction substantially perpendicular to the direction of said urge.

References Cited in the file of this patent

UNITED STATES PATENTS

| | | |
|---|---|---|
| 2,395,557 | Leathers | Feb. 26, 1946 |
| 2,475,307 | Brand | July 5, 1949 |
| 2,589,987 | Braun | Mar. 18, 1952 |
| 2,659,767 | Zenner | Nov. 17, 1953 |